US006821931B2

(12) United States Patent
Rayborn

(10) Patent No.: US 6,821,931 B2
(45) Date of Patent: *Nov. 23, 2004

(54) WATER-BASED DRILLING FLUID ADDITIVE CONTAINING TALC AND CARRIER

(75) Inventor: Jerry Rayborn, Franklinton, LA (US)

(73) Assignee: Alpine Mud Products Corporation, Belle Chasse, LA (US)

( * ) Notice: Subject to any disclaimer, the term of this patent is extended or adjusted under 35 U.S.C. 154(b) by 247 days.

This patent is subject to a terminal disclaimer.

(21) Appl. No.: 10/090,201

(22) Filed: Mar. 5, 2002

(65) Prior Publication Data

US 2003/0176289 A1 Sep. 18, 2003

(51) Int. Cl.[7] .............................. C09K 7/06; C09K 7/02
(52) U.S. Cl. ........................ 507/140; 507/125; 507/103; 507/136; 507/139
(58) Field of Search ................................ 507/140, 125, 507/103, 136, 139

(56) References Cited

U.S. PATENT DOCUMENTS 2,994,670 A * 8/1961 D'Alelio ..................... 521/147
3,476,576 A * 11/1969 Sennett et al. ............... 106/464
3,719,601 A * 3/1973 Jacocks ........................ 252/62
4,829,093 A * 5/1989 Matsukawa et al. .......... 521/53
5,114,597 A * 5/1992 Rayborn et al. ............. 507/126
5,274,057 A * 12/1993 Georges et al. ............. 526/202
5,531,274 A * 7/1996 Bienvenu, Jr. .............. 166/280
5,942,467 A * 8/1999 Rayborn et al. ............. 507/106
6,296,838 B1 * 10/2001 Bindra et al. ................. 424/61
6,330,916 B1 * 12/2001 Rickards et al. ......... 166/280.2
6,448,300 B1 * 9/2002 Maletzko et al. ............. 521/60

FOREIGN PATENT DOCUMENTS

EP 210561 * 2/1987
GB 1141994 * 2/1969

* cited by examiner

Primary Examiner—Philip C. Tucker
(74) Attorney, Agent, or Firm—Dan De La Rosa, Esq.

(57) ABSTRACT

A drilling fluid additive is provided wherein the additive is manufactured by a method comprised of admixing colloidal solids such as talc with at least one carrier such as an oil or glycol to create a suspended mixture to thereby allow the colloidal solids to be pre-wet with the carrier; and then admixing copolymer beads to the suspended mixture.

25 Claims, 2 Drawing Sheets

WATER-BASED DRILLING FLUID ADDITIVE CONTAINING TALC AND CARRIER

BACKGROUND OF THE INVENTION

1. Field of the Invention

This invention relates to an improved method of controlling the filter cake composition of a water-based drilling fluid by admixing colloidal solids with at least one carrier, whereby the colloidal solids are suspended in the carrier and then admixing polymeric beads to the suspension prior to adding the suspended mixture to the drilling fluid. More specifically, the present invention relates to a drilling fluid additive mixture manufactured by a method comprising of pre-wetting copolymer beads and talc with oils or glycols to form a suspended mixture and then adding the suspended mixture to the drilling fluid.

2. Description of the Related Art

New technology in drilling for oil and gas now includes horizontal drilling. The horizontal drilling concept exposes more surface area of the producing zone than the conventional vertical drilling operations. For example, if a producing zone is fifty feet in thickness and a vertical well is drilled through such a zone, then only fifty feet of the producing zone will be exposed for production. In contrast, a horizontally drilled well may penetrate the producing sand or zone by one thousand feet or more. The amount or volume of oil or gas production is directly proportional to the horizontal penetration in feet into the producing sand or zone. In horizontal or directional drilling where the drill pipe must bend in order to achieve the desired penetration into the producing zone, friction becomes a major problem. The primary source of friction is directly related to the adhesion of the drilling assembly to the wall cake which lines the drilled well bore. The capillary attractive forces generated by the adhesion of the drilling assembly to the wall cake are directly proportional to the amount or footage of the drilling assembly exposed to the surface of the wall cake.

In horizontal or directional wells, many methods have been used in order to reduce friction between the drilling assembly and the wall cake. One such method would be to add a liquid lubricant to the drilling fluid in order to reduce the coefficient of friction of the drilling fluid. These liquid lubricants include oils, such as hydrocarbon based oils, vegetable oils, glycols, etc. These liquid lubricants will usually reduce the coefficient of friction of the drilling fluid resulting in a reduction of friction between the drilling assembly and the wall cake of the well bore.

When the liquid lubricant is added to the drilling fluid, it has several options as to how it will react. One option is that the lubricant remains isolated and does not mix well with the drilling fluid. A second option is that the lubricant emulsifies with the water in the drilling fluid to form an oil-in-water emulsion. Still another option is the oil attaching itself to the commercial solids in the drilling fluid or to the drilled cuttings or drilled solids. In certain circumstances, some of the liquid lubricant might be deposited or smeared onto the wall cake of the well bore. The ideal scenario would be to have all of the liquid lubricant deposited on the wall cake.

Those experienced in drilling fluid engineering know that a thin, tough, pliable, and lubricious wall cake is most desirable. The integrity of a wall cake is determined by several factors. The thickness of a wall cake is directly proportional to the amount of liquid leaving the drilling fluid, and being forced into the wall of the well bore by hydrostatic pressure. The thickness of the wall cake is also determined by the type and particle size of the solids in the drilling fluid. Particle Size Distribution, or PSD is important to the wall cake integrity. Experts in drilling fluids also know that materials such as bentonite clay, starches, lignites and polymers are all used to build acceptable wall cakes. It is known in the prior art that various food grade vegetable oils are acceptable lubricants when used alone in water-based drilling fluids. It is also known in the prior art that round co-polymer beads when used alone in water-based drilling fluids function as a good friction reducer. However, much more is required to improve the wall cake integrity and lubricity of most well bores. In addition, there is no technology or process in the prior art that improves the lubrication or friction reducing capacity of the copolymer beads.

Furthermore, the solids control equipment used on the drilling rigs today is far superior as to what was used 15 to 20 years ago. In the past, drilling rig shale shakers would probably be limited to screen sizes of about 20–40 mesh on the shakers. These coarser mesh screens would allow pieces of shale and the drilled formation to pass through the shaker screens back into the drilling fluid and then recirculated back down the well bore. As these larger than colloidal size particles make their way back up the well bore to the surface, the action of the drilling assembly rotating within the well bore forces these larger particles into the surface of the well bore. For example: a 20×20 mesh shaker screen would allow a drilled cutting sized at 863 microns or 0.0340 inches to pass through it and then the cutting would be returned to the well bore and some of these 863 micron cuttings would eventually be embedded into the wall cake. This would give the wall cake surface a texture resembling that of coarse sandpaper. These larger particles would allow the drilling fluid to channel and pass between the drilling assembly and the wall cake thereby reducing the negative effect of the capillary attractive forces generated by the close contact of the drilling assembly with the wall cake. The instances of the drilling assembly becoming stuck to the wall cake when less efficient solids control equipment, such as shale shakers, was used much less than it is today. The more efficient shale shakers today are a great improvement for the drilling fluids but the instances of sticking the drilling assembly are higher. The reason for a higher rate of stuck drilling assemblies today could be blamed on cleaning the drilling fluid to efficiently. Today many drilling rigs utilize cascading shale shakers, which eventually pass the drilling fluid through 200 mesh or 74 micron screens. This is very positive for controlling the percentage of drilled solids in the drilling fluid but it also affects the texture or surface of the wall cake. The finer the solids on the surface of the wall cake are, the greater the capillary attractive forces will be between the drilling assembly and the wall cake.

The present invention provides a method of enhancing the surface of the wall cake. In order to accomplish this, the invention provides a method, which adds something to improve the texture of the surface of the wall cake, and then adds something to prevent large amounts of water from leaving the drilling fluid then passing through the wall cake into the formation. The present invention also provides a carrier for the colloidal solids and beads, which also acts as a lubricant for the drilling fluid. The present invention further provides a process that reduces the effect of capillary attractive forces between the drilling assembly and the wall cake, thereby reducing the tendency of the drilling assembly to become stuck. In high angle directional wells where down hole motors are used to rotate the drill bit and the drill pipe remains stationary, it is important that the drilling assembly can "slide" as the drilling bit cuts more holes. The resent invention improves the ability to "slide" while drilling as stated above.

SUMMARY OF THE INVENTION

In one embodiment, the present invention relates to a drilling fluid additive mixture manufactured by a method comprising of admixing colloidal solids with at least one carrier to create a suspended mixture, the solids having an affinity for oils, esters, glycols and olefins, and the suspended mixture allowing the surface of the solids to be pre-wet with the carrier prior to adding the mixture to a drilling fluid. In another embodiment, the drilling fluid additive mixture further comprises admixing copolymer beads to the suspended mixture. In still another embodiment, the solids have an affinity for oils, esters, glycols and olefins. The carrier of the present invention also functions as a lubricant.

In yet another embodiment, the beads have a specific gravity at from about 1.0 to about 1.5 and a size from about 40 microns to about 1500 microns. In still yet another embodiment, the beads are comprised of styrene and divinylbenzene. In a further embodiment, the solids have a size range from about 2 microns to about 40 microns. In still a further embodiment, the solids are comprised of talc. For purposes of this invention, talc is a mineral, which is magnesium silicate. Talc is extremely hydrophobic and thus, repels water. Since talc has excellent water repellant properties, it would be advantageous to have the surface of the walls of the base mud wall cake to be completely covered or coated with talc.

In yet a further embodiment, the carrier consists essentially of oils, hydrocarbon oils, vegetable oils, mineral oils, paraffin oils, esters, glycols, cellulose and olefins. In still yet a further embodiment, the carrier comprises soybean oil. In another further embodiment, the carrier may be esters, fatty acids and glycols such as poly propylene glycol. In a further embodiment, the carrier comprises oil and a glycol In yet a further embodiment, the carrier consists essentially of polyanionic cellulose, polyanionic cellulose polymer, and carboxymethylcellulose.

In still another further embodiment, the solids comprises from about 2% to about 50% of the additive mixture of the present invention. In yet another further embodiment, the carrier comprises from about 50% to about 98% of the additive mixture. In still yet another embodiment, the beads comprises from about 2% to about 50% of the additive mixture.

In another embodiment, the present invention relates to a method of manufacturing a drilling fluid additive mixture, the method comprises: shearing colloidal solids with at least one carrier to create a suspended mixture to thereby allow the surface of the solids to be pre-wet with the carrier; and admixing copolymer beads to the suspended mixture. In yet another embodiment, the solids and the beads having an affinity for oils, esters, glycols and olefins. In another embodiment, the beads are sheared with the suspended mixture until a homogeneous mixture is formed.

In still yet another embodiment, the beads have a specific gravity at from about 1.0 to about 1.5 and a size from about 40 microns to about 1500 microns. In a further embodiment, the beads are comprised of styrene and divinylbenzene. In yet a further embodiment, the solids have a size range from about 2 microns to about 40 microns. In still yet a further embodiment, the solids are comprised of talc. In another further embodiment, the carrier consists essentially of oils, vegetable oils, mineral oils, paraffin oils, esters, glycols, cellulose and olefins. In yet another further embodiment, the carrier comprises polypropylene glycol. The combination of hydrophobic talc and polypropylene glycol as an additive, functions as an excellent plugging agent. For purposes of this invention, the term "plugging agent" is defined as a solid having a particular size and shape so as to plug or seal off the surface micro-fractures of a porous sand, shale, or formation being drilled.

In still yet another embodiment, the solids comprises from about 2% to about 50% of the additive mixture of the present invention. In yet another further embodiment, the carrier comprises from about 50% to about 98% of the additive mixture. In still yet another embodiment, the beads comprises from about 2% to about 50% of the additive mixture.

In another embodiment, the present invention provides a method of improving the filter cake composition of a water-based drilling fluid, the method comprising: shearing colloidal solids with at least one carrier to create a suspended mixture to thereby allow the solids to be pre-wet with the carrier; admixing copolymer beads to the suspended mixture thereby allowing said beads to be pre-wet with the carrier; adding the suspended mixture to a water-based drilling fluid; and adding the additive to a well bore.

In yet another embodiment, the solids and the beads have an affinity for oils, esters, glycols and olefins. In still another embodiment, the beads have a specific gravity at from about 1.0 to about 1.5 and a size from about 40 microns to about 1500 microns, and the beads are comprised of styrene and divinylbenzene. In yet another embodiment, the solids have a size range from about 2 microns to about 40 microns. In still yet another embodiment, solids are comprised of talc. In a further embodiment, the carrier consists essentially of oils, hydrocarbon oils, vegetable oils, mineral oils, paraffin oils, esters, glycols and olefins. In still another further embodiment, the carrier comprises soybean oil. In a further embodiment, the talc of the present invention functions as a suspension agent and by making the talc oil wet, it becomes more hydrophobic and thus, more effective. In another further embodiment, the combination of talc and oil functions as an excellent plugging agent.

In another embodiment, the solids comprises from about 2% to about 50% of the additive mixture, the carrier comprises from about 50% to about 98% of the additive mixture, and the beads comprises from about 2% to about 50% of the additive mixture.

BRIEF DESCRIPTION OF THE DRAWINGS

The accompanying drawings are included to provide a further understanding of the present invention. These drawings are incorporated in and constitute a part of this specification, illustrate one or more embodiments of the present invention, and together with the description, serve to explain the principles of the present invention.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention that may be embodied in various forms. The figures are not necessary to scale; some features may be exaggerated to show details of particular components. Therefore, specific structural and functional details disclosed herein are not to be interpreted as limiting, but merely as a basis for the claims and as a representative basis for teaching one skilled in the art to variously employ the present invention.

The present invention provides a process that includes selecting specific materials having different particle sizes and then pre-wetting each particle with an environmentally acceptable lubricant prior to adding these particles to the water-based drilling fluid. This process produces much improved wall cake integrity and lubricity. The present invention also teaches that food grade vegetable oils are excellent carriers for various solid friction reducers and wall cake enhancers. The present invention has also discovered that pre-wetting the round copolymer beads with a food grade vegetable oil prior to adding the copolymer beads to the drilling fluid improves the lubrication or friction reducing capacity of the copolymer beads. The other criterion is that the products and its components have to be environmentally friendly.

Figure 1:
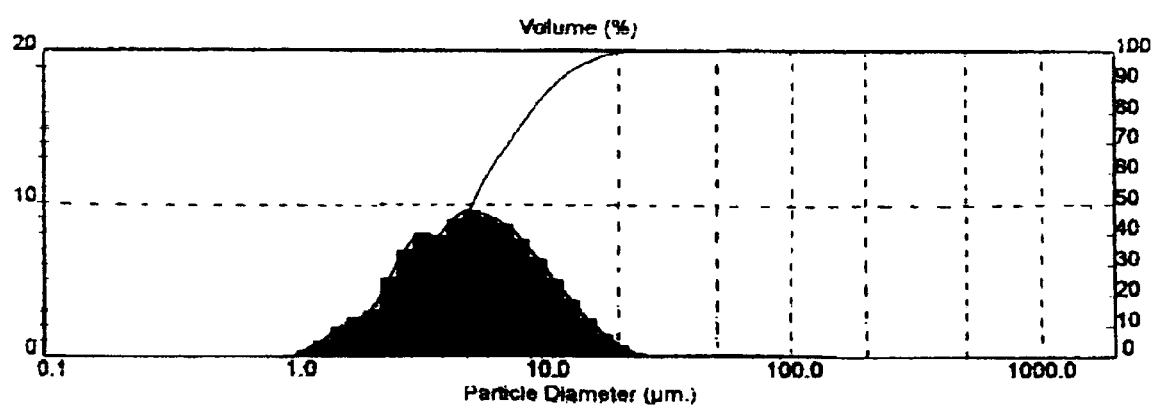
FIG. 1 is a graph representing talc particle size versus volume in percent.

In accordance with the manufacturing process of the present invention, talc powder is sheared with an environmentally friendly oil or liquid lubricant, which repels water. The shearing should continue until each organophilic or hydrophobic talc particle is coated with the oil or liquid lubricant. In one embodiment, the talc powder most preferred would be one with a particle size from about 1 micron to about 20 microns and one which would produce a bell shaped curve having the majority of the particles in the 2 micron to 8 micron size, as shown in FIG. 1.

The polymeric beads of the present invention should be a solid particle, preferably round and have a specific gravity close to 1.0 and have a size from about 100 microns to about 900 microns. The beads must also have an affinity for oils, esters, olefins and glycols, etc. It was determined that a copolymer bead manufactured by Dow Chemical comprised of styrene and divinylbenzene would be acceptable.

The colloidal solids of the present invention should have a size range of 2–10 microns since tests have proven that this particle size will bridge sandstone having a permeability of 200 md. The solids must also have an affinity for oils, esters, olefins and glycols, etc. In one embodiment, the solids are talc. The talc of the present invention also functions as an excellent suspending agent in both oils and glycols. FIG. 1 depicts a graphical representation of the particle size of talc and Table 1, as set forth below, represents the result statistics for the particle size for talc:

TABLE 1

Particle Size Statistics For Talc

| Dist. Type: Vol | Concentration = 0.0136% Vol | Density = 2.650 g/cub.cm | Spec. SA = 0.5176 sq.m/g |
|---|---|---|---|
| Mean Diameters: | D (v, 0.1) = 2.40 um | D (v, 0.5) = 5.28 um | D (v, 0.9) = 11.68 um |
| D [4, 3] = 6.30 um | D [3, 2] = 4.37 um | Span = 1.760E + 00 | Uniformity = 5.495E − 01 |
| Size Low (um) | In % | Size High (um) | Under % |
| 0.31 | 0.00 | 0.36 | 0.00 |
| 0.36 | 0.00 | 0.42 | 0.00 |
| 0.42 | 0.00 | 0.49 | 0.00 |
| 0.49 | 0.00 | 0.58 | 0.00 |
| 0.58 | 0.00 | 0.67 | 0.00 |
| 0.67 | 0.00 | 0.78 | 0.00 |
| 0.78 | 0.00 | 0.91 | 0.00 |
| 0.91 | 0.02 | 1.06 | 0.02 |
| 1.06 | 0.32 | 1.24 | 0.35 |
| 1.24 | 0.94 | 1.44 | 1.29 |
| 1.44 | 1.83 | 1.68 | 3.12 |
| 1.68 | 2.51 | 1.95 | 5.62 |
| 1.95 | 2.94 | 2.28 | 8.57 |
| 2.28 | 5.05 | 2.65 | 13.62 |
| 2.65 | 6.89 | 3.09 | 20.51 |
| 3.09 | 7.96 | 3.60 | 28.47 |
| 3.60 | 7.81 | 4.19 | 36.29 |
| 4.19 | 8.89 | 4.88 | 45.18 |
| 4.88 | 9.49 | 5.69 | 54.67 |
| 5.69 | 9.05 | 6.63 | 63.72 |
| 6.63 | 8.60 | 7.72 | 72.33 |
| 7.72 | 7.61 | 9.00 | 79.94 |
| 9.00 | 6.35 | 10.48 | 86.29 |
| 10.48 | 5.02 | 12.21 | 91.31 |
| 12.21 | 3.70 | 14.22 | 95.01 |
| 14.22 | 2.47 | 16.57 | 98.95 |
| 16.57 | 1.46 | 19.31 | 99.68 |

TABLE 1-continued

Particle Size Statistics For Talc

| Dist. Type: Vol<br>Mean Diameters:<br>D [4, 3] = 6.30 um<br>Size Low (um) | Concentration = 0.0136% Vol<br>D (v, 0.1) = 2.40 um<br>D [3, 2] = 4.37 um<br>In % | Density = 2.650 g/cub.cm<br>D (v, 0.5) = 5.28 um<br>Span = 1.760E + 00<br>Size High (um) | Spec. SA = 0.5176 sq.m/g<br>D (v, 0.9) = 11.68 um<br>Uniformity = 5.495E − 01<br>Under % |
|---|---|---|---|
| 19.31 | 0.73 | 22.49 | 100.00 |
| 22.49 | 0.27 | 26.20 | 100.00 |
| 26.20 | 0.05 | 30.53 | 100.00 |
| 30.53 | 0.00 | 35.56 | 100.00 |
| 35.56 | 0.00 | 41.43 | 100.00 |
| 41.43 | 0.00 | 48.27 | 100.00 |
| 48.27 | 0.00 | 56.23 | 100.00 |
| 56.23 | 0.00 | 65.51 | 100.00 |
| 65.51 | 0.00 | 76.32 | 100.00 |
| 76.32 | 0.00 | 88.91 | 100.00 |
| 88.91 | 0.00 | 103.58 | 100.00 |
| 103.58 | 0.00 | 120.67 | 100.00 |
| 120.67 | 0.00 | 140.58 | 100.00 |
| 140.58 | 0.00 | 163.77 | 100.00 |
| 163.77 | 0.00 | 190.80 | 100.00 |
| 190.80 | 0.00 | 222.28 | 100.00 |
| 222.28 | 0.00 | 258.95 | 100.00 |
| 258.95 | 0.00 | 301.68 | 100.00 |

The carrier of the present invention may be selected from different oils, olefins, esters, fatty acids, cellulose and glycols. In another embodiment, the carrier may be synthetic oils, diesel oils, rice oils, cottonseed oils, corn oils, safalour oils, linseed oils, coconut oils, vegetable oils, mineral oils, and paraffin oils. In still another embodiment, the carrier is soybean oil. The oil coating on the hydrophobic talc particles enhances the plugging action of the talc across or into micro fractures in sands, shale and other substances down hole.

In a further embodiment, the present invention relates to a method of manufacturing a drilling fluid additive whereby talc and copolymer beads are added to soybean oil and mixed or sheared until each particle of talc and copolymer bead is oil wet. A first sample was produced by addition of 350 grams of soybean oil with 5 grams of talc and 100 grams of polymer beads to the oil, and then mixing all the components for 10 minutes using a waring blender. After blending, the mixture was placed in a beaker for observation. The mixture appeared homogeneous and initially resembled buttermilk. After 5 minutes, the beads began to settle. After one hour, all the beads settled to the bottom of the beaker and some of the oil began separating from the mixture and clear oil was present at the upper portion of the beaker. After sitting overnight (10 hours later), the upper portion of the beaker was clear oil and the bottom portion was the talc, beads and oil. Pouring the clear oil off exposed that the beads had settled and packed tightly preventing the beads from pouring out of the beaker. This sample could not be placed in a drum or tank for shipping because the beads would settle and plug the drum or tank.

Figure 2:
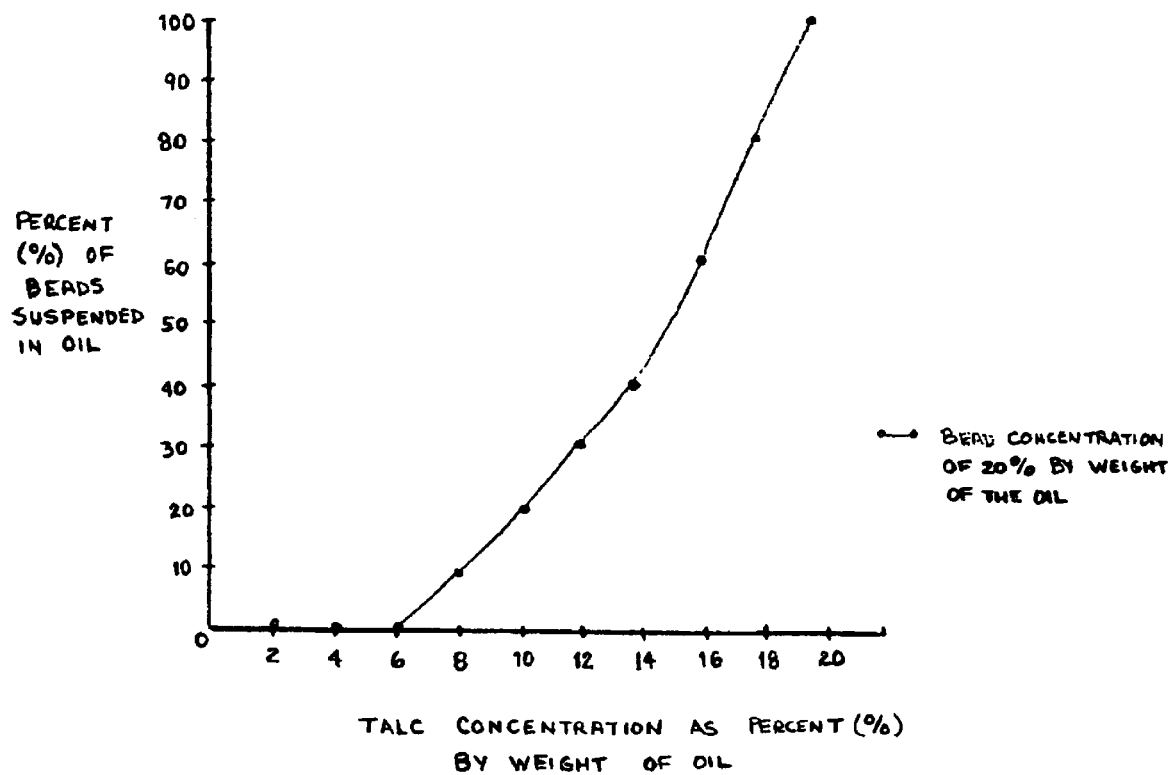
FIG. 2 is a graph representing the percent of beads suspended in oil versus the talc concentration as percent by weight of oil.

A second sample was produced by adding talc to the oil and eliminating the beads initially. It was discovered that the oil accepted approximately 40% by weight of talc. After sitting overnight, there was no separation between the talc and the oil. At that point, small additions of beads were added to the above mixture. The addition of 2% by weight of beads to the talc/oil mixture was encouraging. The beads settled slightly but did not pack off. As the concentration of the beads was increased in the mixture, it was discovered that the beads remained suspended in the mixture. FIG. 2 depicts graphical representations of the talc concentration as percent (%) by weight of oil versus the percent (%) of beads suspended in oil. FIG. 2 illustrates that as the talc concentration as a percent (%) by weight of the oil increases, the suspension qualities of the liquid oil increases. As FIG. 2 illustrates, the talc concentration of 20 percent by weight of the liquid oil suspends 100 percent of the copolymer beads.

The second sample was then heated to 150 degrees Fahrenheit for 24 hours and the copolymer beads remained suspended. The mixture was then cooled to 35 degrees Fahrenheit for 24 hours and the copolymer beads remained suspended. It was also discovered that the optimum concentration of the beads was from about 20 percent to about 30 percent by weight of the oil, and the concentration of the talc should be around 20 percent by weight of oil. Although this sample appears to be the best, the concentration may vary.

The specific examples throughout the specification will enable the present invention to be better understood. However, they are merely given by way of guidance and do not imply any limitations. Example 1 conducted tests on a 9.9 pounds per gallon (ppg) water-based drilling fluid and Example 2 conducted tests on a 16.9 pounds per gallon (ppg) water-based drilling fluid. Example 3 conducted tests on the reduction of capillary forces in both the 9.9 ppg drilling fluid of Example 1 and the 16.9 ppg drilling fluid of Example 2.

EXAMPLE 1

Test 1: Rheology & HPHT Results

In Example 1, a 9.9 pound per gallon water-based drilling fluid was tested for the (a) the compatibility of the drilling fluid—such as rheology; and the yield point and gels in particular; (b) the high pressure high temp fluid loss—HPHT; (c) the filter cake wt./gram; and (d) the filter cake thickness (in inches). Parameters were first tested on the base mud. By comparison, 2 percent (%) by volume of the oil, talc and the beads mixture was added to the base drilling fluid and mixed for 5 minutes on a waring blender. In Test 1 & Table 2, the following rheology and HPHT results were noted:

TABLE 2

Rheology & HPHT Results

| | BASE | BASE & 2% TALC MIXTURE | % REDUCTION |
|---|---|---|---|
| Density | 9.9 | | |
| PH Meter | 10.3 | | |
| 600rpm | 19 | 22 | |
| 300rpm | 11 | 13 | |
| 200 rpm | 8 | 10 | |
| 100 rpm | 5 | 6 | |
| 6 rpm | 2 | 1 | |
| 3 rpm | 2 | 1 | |
| PV @ 120F | 8 | 9 | |
| YP | 3 | 4 | |
| Gels 10 sec/10 min | 2/13 | 1/17 | |
| HPHT @ 200 Deg F/ml | 12.0 | 8.0 | 33% |
| Cake Wt./g | 5.9 | 5.4 | 8% |
| Cake Thickness/inch | 3/32 | 2/32 | 33% |
| MBT/pbb | 30 | | |
| Solid/Oil/Water | 10/00/90 | | |

The results of Example 1, Test 1 indicate the following: the talc, bead and oil mixture was very compatible with the mud rheology with only slight increases in yield point and gels. The HPHT fluid loss was reduced from 12.0 to 8.0; a 33% reduction, which is excellent. The cake in weight in grams was reduced from 5.9 grams to 5.4 grams, an 8% reduction. The cake thickness in inches was reduced from 3/32 to 2/32, a 33% reduction, which is also excellent.

EXAMPLE 1
Test 2: Dynamic Filtration

In Example 1, Test 2, the following dynamic filtration criteria were tested: (a) Fluid loss versus time; (b) Filter cake wt/gram; and (c) Filter cake thickness in inches. The dynamic filtration data of Example 1, Test 2 is set forth in Table 3 below:

TABLE 3

DYNAMIC FILTRATION
5 Darcy, 50 Micron Filter Media
200 Degrees F., 600 rpm @ 1000 PSI for 60 Minutes

| | Fluid Loss (ml) | | |
|---|---|---|---|
| TIME (Minutes) | BASE | BASE & 2% TALC MIXTURE | % REDUCTION |
| Initial Spurt | 1.5 | trace | |
| 15 | 12.6 | 5.8 | |
| 30 | 17.0 | 10.0 | |
| 45 | 21.2 | 14.0 | |
| 60 | 24.0 | 16.8 | 30% |
| Cake Wt/g | 10.7 | 5.8 | 46% |
| Cake Thickness/Inch | 3/32 | 2/32 | 33% |

The results of Example 1, Test 2 are as follows: after 60 minutes, the dynamic fluid loss was reduced from 24.0 ml to 16.8 ml, a 30% reduction, which is excellent. The cake weight in grams was reduced from 10.7 grams to 5.8 grams, a 46% reduction, which is also excellent. The cake thickness was reduced from 3/32 to 2/32, a 33% reduction, which is excellent.

EXAMPLE 1
Test 3: Lubricity Test

Table 4 below shows the test results of the lubricity of the additive as torque is applied.

TABLE 4

LUBRICITY TEST @ 60 rpms
Co-efficient of Friction of Water (0.33 − 0.36) = 0.33; i.e. reading at 150 inch pounds is 33

Lubricity Reading
(electric current required to sustain 60 rpm at applied torque)

| Applied Torque/ Inch Pounds | BASE | BASE & 2% TALC MIXTURE | % REDUCTION |
|---|---|---|---|
| 100 | 10 | 11 | |
| 150 | 16 | 16 | |
| 200 | 21 | 21 | |
| 300 | 31 | 28 | |
| 400 | 44 | 37 | |
| 500 | 66 | 50 | |
| 600 | 80 | 65 | 19% |

The lubricity results of Example 1, Test 3 indicate an improvement in lubrication was about 19% at the 600 reading on the lubricity tester.

EXAMPLE 1
Test 4: Texture of Dynamic Filter Cake Surfaces

The texture of the filter cake surfaces and the surfaces of the base mud were also tested. The results were as follows: the texture of the surface of the base mud was extremely smooth and shinny. The texture of the Dynamic Filter Cake Surface of the base mud treated with 2% by volume of the talc, bead and oil mixture was shinny and the copolymer beads could be seen impregnated in the cake as well as protruding on the surface of the cake.

EXAMPLE 2
Test 1: Rheology & HPHT Results

In Example 2, a 16.9 pound per gallon water-based drilling fluid was tested for the (a) the compatibility of the drilling fluid—such as rheology; and the yield point and gels in particular; (b) the high pressure high temp fluid loss—HPHT; (c) the filter cake wt./gram; and (d) the filter cake thickness (in inches). Parameters were first tested on the base mud. By comparison, 2 percent (%) by volume of the oil, talc and the beads mixture was added to the base drilling fluid and mixed for 5 minutes on a waring blender. In Example 2, Test 1, the following rheology and HPHT results were noted in Table 5 below:

TABLE 5

Rheology & HPHT Results

| | BASE | BASE & 2% TALC MIXTURE | % REDUCTION |
|---|---|---|---|
| Density | 16.9 | | |
| PH Meter | 10.4 | | |
| 600 rpm | 53 | 56 | |
| 300 rpm | 30 | 32 | |
| 200 rpm | 22 | 25 | |
| 100 rpm | 13 | 15 | |
| 6 rpm | 2 | 3 | |
| 3 rpm | 1 | 2 | |
| PV @ 120 F. | 23 | 24 | |
| YP | 7 | 8 | |
| Gels 10 sec/10 min | 4/19 | 5/27 | |
| HPHT @ 300 Deg F./ml | 15.0 | 13.2 | 12% |
| Cake Wt./g | 27.2 | 18.7 | 31% |
| Cake Thickness/inch | 6/32 | 4/32 | 33% |

The results of Example 2, Test 1 indicate the following: in Test 2, Table 5, the talc, beads and oil mixture was very compatible with the mud rheology with little change points and gel. The HPHT fluid loss was reduced from 15.0 to 13.2, a 12% reduction, which is somewhat less than expected. The cake weight in grams was reduced from 27.2 grams to 18.7 grams, a 31% reduction, which is a very good result. The cake thickness was reduced from 6/32 to 4/32, a 33% reduction.

EXAMPLE 2
Test 2: Dynamic Filtration

In Example 2, Test 2, the following dynamic filtration criteria were tested: (a) Fluid loss versus time; (b) Filter cake wt/gram; and (c) Filter cake thickness in inches. The dynamic filtration data of Example 2, Test 2 is set forth in Table 6 below:

TABLE 6

DYNAMIC FILTRATION
10 Darcy, 35 Micron Filter Media
300 Degrees F., 600 rpm @ 1000 PSI for 60 Minutes

| | Fluid Loss (ml) | | |
|---|---|---|---|
| TIME (Minutes) | BASE | BASE & 2% TALC MIXTURE | % REDUCTION |
| Initial Spurt | 1.0 | 0.5 | |
| 15 | 25.2 | 17.6 | |
| 30 | 38.0 | 25.0 | |
| 45 | 46.0 | 31.4 | |
| 60 | 53.2 | 36.0 | 32% |
| Cake Wt/g | 91 | 62 | 32% |
| Cake Thickness/Inch | 18/32 | 12/32 | 33% |

The results of Example 2, Test 2, Table 6 are as follows: after 60 minutes, the dynamic fluid loss was reduced from 24.0 ml to 16.8 ml, a 32% reduction, which is an excellent result. The cake weight in grams was reduced from 91 grams to 62 grams, a 32% reduction, which is a very good result. The filter cake was reduced from 18/32 to 12/32, a 33% reduction, which is also an excellent result.

EXAMPLE 2
Test 3: Lubricity Test

Table 7 below shows the test results of the lubricity of the additive as torque is applied.

TABLE 7

LUBRICITY TEST @ 60 rpms
Co-efficient of Friction of Water (0.33 – 0.36) = 0.33; i.e.
reading at 150 inch pounds is 33

| | Lubricity Reading (electric current required to sustain 60 rpm at applied torque) | | |
|---|---|---|---|
| Applied Torque/ Inch Pounds | BASE | BASE & 2% TALC MIXTURE | % REDUCTION |
| 100 | 14 | 9 | |
| 150 | 23 | 12 | |
| 200 | 30 | 15 | |
| 300 | 46 | 20 | |
| 400 | 60 | 23 | |
| 500 | 76 | 25 | |
| 600 | 92 | 28 | 70% |

The lubricity results of Example 2, Test 3 indicate an improvement in lubrication was about 70% at the 600 reading on the lubricity tester, which is an excellent result.

EXAMPLE 2
Test 4: Texture of Dynamic Filter Cake Surfaces

The texture of the filter cake surfaces and the surfaces of the base mud were also tested. The results were as follows: the texture of the surface of the base 16.9 ppg mud was smooth and shinny. The texture of the Dynamic Filter Cake surface of the base mud treated with 2% by volume of the talc, bead and oil mixture was shinny and the copolymer beads could be seen impregnated in the cake as well as protruding on the surface of the cake.

EXAMPLE 3
Reduction in Capillary Attractive Forces of Examples 1 & 2

In Example 3, the (dynamic) filter cake of the base mud was placed on a flat surface and a piece of glass ¼ inch thick and four inches square was placed flat on the surface of the base mud filter cake and allowed to sit for thirty minutes. An attempt was then made to lift the glass from the filter cake. As the glass plate was lifted, the filter cake followed and it was as though the filter cake was glued to the glass.

The (dynamic) filter cake of the base mud to which 2% of the additive of the present invention was added was placed on the flat surface and the same process discussed above was duplicated. It was found that the piece of glass easily separated from the filter cake surface, which was treated with the additive of the present invention. The results show that the additive mixture of the present invention definitely reduced, if not, eliminated the capillary attractive forces of the wall cake.

Since the above tests were conducted in open air on the counter top, it was determined that the same tests should be conducted while totally submerged in the drilling fluid. In running the same tests with the filter cake and the 4 inch piece of glass completely submerged in the drilling fluid, it would be concluded that no air would be present in the filter cake or the glass surface and such a test would resemble a wellbore filled with drilling fluid. This test results were as follows: the glass plate stuck more firmly to the submerged water-based mud wall cakes than it did in open air; and the glass plate would not stick to the wall cakes of the water-based muds, which were treated with the 2% by volume of the drilling fluid additive of the present invention.

Numerous modifications and variations of the present invention are possible in light of the above teachings. It is therefore to be understood that within the scope of the attendant claims attached hereto, this invention may be practiced otherwise than as specifically disclosed herein.

What is claimed is:

1. A drilling fluid additive mixture manufactured by a method comprising of:
    admixing talc with at least one carrier to create a suspended mixture, said suspended mixture allowing the surface of said talc to be pre-wet with said carrier, said carrier being selected from a group consisting of oils, glycols, esters, olefins and mixtures thereof, and admixing copolymer beads to said mixture prior to adding said mixture to a drilling fluid.

2. The drilling fluid additive mixture of claim 1 wherein said beads have a specific gravity at from about 1.0 to about 1.5 and a size from about 40 microns to about 1500 microns.

3. The drilling fluid additive mixture of claim 1 wherein said beads are comprised of styrene and divinylbenzene.

4. The drilling fluid additive mixture of claim 1 wherein said talc has a size range from about 2 microns to about 40 microns.

5. The drilling fluid additive mixture of claim 1 wherein said carrier consist essentially of oils, hydrocarbon oils, vegetable oils, mineral oils, paraffin oils, synthetic oils, diesel oils, esters, glycols, cellulose and olefins.

6. The drilling fluid additive mixture of claim 1 wherein said carrier comprises soybean oil.

7. The drilling fluid additive mixture of claim 1 wherein said talc comprises from about 2% to about 50% of said additive mixture.

8. The drilling fluid additive mixture of claim 1 wherein said carrier comprises from about 50% to about 98% of said additive mixture.

9. The drilling fluid additive mixture of claim 1 wherein said beads comprises from about 2% to about 50% of said additive mixture.

10. A method of manufacturing a drilling fluid additive mixture, said method comprising:

shearing talc with at least one carrier to create a suspended mixture to thereby allow the surface of said talc to be pre-wet with said carrier, said carrier being selected from a group consisting of oils, glycols, esters, olefins and mixtures thereof; and admixing copolymer beads to said suspended mixture.

11. The method of claim 10 wherein said beads have a specific gravity at from about 1.0 to about 1.5 and a size from about 40 microns to about 1500 microns.

12. The method of claim 10 wherein said beads are comprised of styrene and divinylbenzene.

13. The method of claim 10 wherein said talc has a size range from about 2 microns to about 40 microns.

14. The method of claim 10 wherein said carrier comprises polypropylene glycol.

15. The method of claim 10 wherein said talc comprises from about 2% to about 50% of said additive mixture.

16. The method of claim 10 wherein said carrier comprises from about 50% to about 98% of said additive mixture.

17. The method of claim 10 wherein said beads comprises from about 2% to about 50% of said additive mixture.

18. A method of improving the filter cake composition of a water-based drilling fluid, said method comprising:

shearing talc with at least one carrier to create a suspended mixture to thereby allow said talc to pre-wet with said carrier, said carrier being selected from a group consisting of oils, glycols, esters, olefins and mixtures thereof;

admixing copolymer beads to said suspended mixture thereby allowing said beads to be pre-wet with said carrier and shearing until a homogeneous mixture is formed;

adding said suspended mixture to a water-based drilling fluid; and pumping said additive into a well bore.

19. The method of claim 18 wherein said beads have a specific gravity at from about 1.0 to about 1.5 and a size from about 40 microns to about 1500 microns, said beads are comprised of styrene and divinylbenzene.

20. The method of claim 18 wherein said talc has a size range from about 2 microns to about 40 microns.

21. The method of claim 18 wherein said carrier comprises oil and glycol.

22. The method of claim 18 wherein said talc comprises from about 2% to about 25% of said additive mixture, said carrier comprises from about 50% to about 96% of said additive mixture, and said beads comprises from about 2% to about 25% of said additive mixture.

23. A drilling fluid additive comprising: talc, copolymer beads and at least one carrier, said carrier being selected from a group consisting of oils, glycols, esters, olefins and mixtures thereof.

24. The drilling fluid additive of claim 23 wherein said beads have a specific gravity of from about 1.0 to about 1.5 and a size from about 40 microns to about 1500 microns, said beads are comprised of a material selected from a group consisting of styrene, divinylbenzene and mixtures thereof.

25. The drilling fluid additive of claim 23 wherein said talc comprises from about 2% to about 25% of said additive mixture, said carrier comprises from about 50% to about 96% of said additive mixture, and said beads comprise from about 2% to about 25% of said additive mixture.

* * * * *